United States Patent
Karavolos

[11] Patent Number: 6,037,597
[45] Date of Patent: Mar. 14, 2000

[54] NON-DESTRUCTIVE DETECTION SYSTEMS AND METHODS

[75] Inventor: Angelo Karavolos, Champaign, Ill.

[73] Assignee: Neutech Systems, Inc., Champaign, Ill.

[21] Appl. No.: 09/025,554

[22] Filed: Feb. 18, 1998

Related U.S. Application Data

[60] Provisional application No. 06/038,847, Feb. 18, 1997.
[51] Int. Cl.[7] ............................. G21G 1/10; G01N 23/00; G01J 1/42
[52] U.S. Cl. ............... 250/393; 250/390.04; 250/390.06; 376/191
[58] Field of Search ............................... 250/269.2, 269.4, 250/269.5, 269.6, 390.06, 390.04, 394, 391, 393; 376/191

[56] References Cited

U.S. PATENT DOCUMENTS

| | | |
|---|---|---|
| Re. 27,579 | 2/1973 | Youmans . |
| 2,270,373 | 1/1942 | Kallmann et al. . |
| 2,288,717 | 7/1942 | Kallmann et al. . |
| 2,297,478 | 9/1942 | Kallmann et al. . |
| 2,344,043 | 3/1944 | Kallmann et al. . |
| 3,124,679 | 3/1964 | Tittman et al. . |
| 3,146,349 | 8/1964 | Jordan . |
| 3,255,352 | 6/1966 | Johnston . |
| 3,299,268 | 1/1967 | Muto et al. . |
| 3,308,296 | 3/1967 | Cowan et al. . |
| 3,422,264 | 1/1969 | Martina . |
| 3,662,882 | 5/1972 | Obermayer . |
| 3,670,715 | 6/1972 | Perilhou et al. . |
| 3,808,444 | 4/1974 | Schneeberger et al. . |
| 3,832,545 | 8/1974 | Bartko . |
| 3,997,787 | 12/1976 | Fearon et al. . |
| 4,090,074 | 5/1978 | Watt et al. . |
| 4,251,726 | 2/1981 | Alvarez . |
| 4,263,098 | 4/1981 | Kasperek et al. . |
| 4,266,132 | 5/1981 | Marshall, III . |
| 4,718,268 | 1/1988 | Reid et al. . |
| 4,851,687 | 7/1989 | Ettinger et al. . |
| 4,853,550 | 8/1989 | Schulz . |
| 4,864,142 | 9/1989 | Gomberg . |
| 4,882,121 | 11/1989 | Grenier . |
| 4,918,315 | 4/1990 | Gomberg et al. . |
| 5,006,299 | 4/1991 | Gozani et al. . |
| 5,080,856 | 1/1992 | Grenier et al. . |
| 5,087,821 | 2/1992 | Maitrejean et al. . |
| 5,098,640 | 3/1992 | Gozani et al. . |
| 5,124,554 | 6/1992 | Fowler et al. . |
| 5,144,140 | 9/1992 | Allyson et al. . |
| 5,153,439 | 10/1992 | Gozani et al. . |
| 5,200,626 | 4/1993 | Schultz et al. . |
| 5,247,177 | 9/1993 | Goldberg et al. . |
| 5,278,418 | 1/1994 | Broadhurst . |
| 5,281,822 | 1/1994 | Albrecht et al. . |
| 5,373,538 | 12/1994 | Grenier et al. . |
| 5,479,023 | 12/1995 | Bartle . |
| 5,539,788 | 7/1996 | Ruddy et al. ...................... 250/390.04 |

FOREIGN PATENT DOCUMENTS

| | | | |
|---|---|---|---|
| 2079926 | 11/1971 | France ............................. | 250/390.06 |
| 44-20160 | 8/1969 | Japan ..................................... | 376/191 |

*Primary Examiner*—Edward P. Westin
*Assistant Examiner*—Adrianne Riorere
*Attorney, Agent, or Firm*—Woodard, Emhardt, Naughton Moriarty & McNett

[57] ABSTRACT

Described are preferred devices and systems useful in the non-destructive detection of predetermined substances, such as plastique explosives, in objects under interrogation. The devices and systems are readily constructed and can be manufactured as self-contained, portable detection devices.

9 Claims, 4 Drawing Sheets

NON-DESTRUCTIVE DETECTION SYSTEMS AND METHODS

CROSS-REFERENCE TO RELATED APPLICATIONS

This application claims priority from U.S. patent application Ser. No. 60/038,847 filed Feb. 18, 1997.

BACKGROUND OF THE INVENTION

The present invention relates generally to non-destructive testing, and more specifically to a non-destructive detection system of novel, inexpensive construction utilizing epithermal neutrons and characteristic energies generated by the same upon interacting with an object under study.

As further background, a variety of non-destructive detection systems are known for use in applications such as the detection of explosives in luggage or other packages. Current technologies utilized in such detection systems include principles derived from NMR, atomic adsorption, X-ray fluorescence, neutron activation analysis, and X-ray analysis. In addition, a few attempts have been made to utilize CT technology and quadripole moment techniques in such systems. Additional relevant background as to known techniques for non-destructive detection can be found, for instance, in U.S. Pat. Nos: 2,270,373; 2,288,717; 2,297,478; 2,344,043; 3,124,679; 3,146,349; 3,255,352; 3,670,715; 3,832,545; 4,266,132 4,853,550; 4,864,142; 4,882,121; 5,006,299; 5,080,856; 5,098,640; 5,124,554; 5,144,140; 5,153,439; and 5,200,626.

Drawbacks of known systems, however, include relatively high construction and operation expense and complexity of the devices utilized both to bombard the sample and receive characteristic signals from an object or sample. The present invention is addressed to the need for a relatively simple, inexpensive device and system which can be utilized to non-destructively interrogate materials, including for example luggage or other packages, and to determine the presence or absence of a given substance in the materials.

SUMMARY OF THE INVENTION

Accordingly, the invention provides in one preferred embodiment a device for delivering epithermal neutrons, which is a laminate of several polymer layers, e.g. wherein the polymer is high density polyethylene. In particular, the preferred device includes a first polymer layer having embedded therein a source of alpha-radiation, and a second polymer layer which is generally non-permeable or opaque to alpha-radiation and having defined therein a diffraction opening for passing alpha-radiation from the source of alpha-radiation embedded in the first polymer layer. The device further includes a third polymer layer having embedded therein a chemical source of boron, the third polymer layer being positioned relative to the second polymer layer such that alpha-radiation from the source of alpha-radiation impinges upon the source of boron, thereby generating epithermal neutrons. The device further includes a fourth polymer layer which is generally impermeable to the epithermal neutrons and defines a diffraction opening for passing the generated epithermal neutrons.

Another embodiment of the invention includes a source/detector array device useful for interrogating an object. In accordance with the invention the array device includes a non-conductive layer such as mylar having affixed thereto an array of self-contained radiation sources selected for thermal neutron sources, infrared radiation sources, and X-ray sources. Also attached to the non-conductive layer in the array are a plurality of signal detectors selected from X-ray detectors, neutron detectors, infrared detectors, and gamma ray detectors. Further, the non-conductive layer includes an imprinted pattern of conductive material electrically connected to the detectors in the array, for transmitting signals generated by the detector, e.g. for immediate analysis or to memory storage for later analysis.

Still another preferred embodiment of the invention provides a method for interrogating an object, comprising disposing the object next to an array device such as that described in the paragraph above. The object is bombarded with radiant energy (e.g. x-rays, infrared radiation and/or epithermal neutrons) generated by the self-contained sources, and characteristic radiant signals are generated by the interaction of the radiant energy and the object. The signals can then be analyzed to determine the presence or absence of a predetermined substance in the object.

The present invention provides non-destructive detection systems and methods, and component devices useful therein, which are relatively simple in construction and relatively inexpensive in manufacture. Additional objects, features and advantages of the invention will be apparent from the following description.

DESCRIPTION OF THE PREFERRED EMBODIMENT

Figure 1:
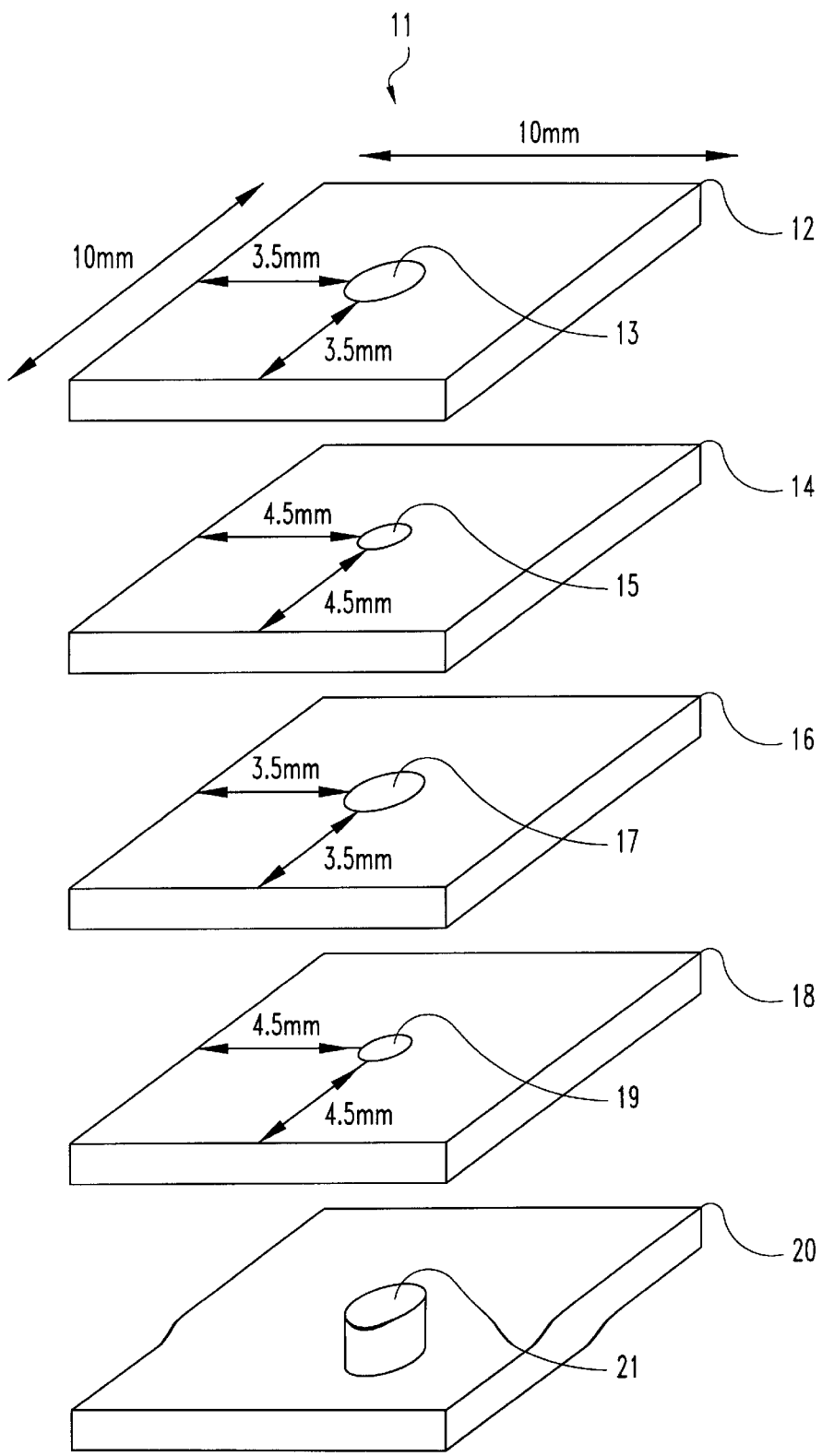
FIG. 1 is a perspective view illustrating a laminate device of the invention for delivering epithermal neutrons.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As indicated above, the present invention provides non-destructive detection systems and methods, and devices useful in the same.

Referring now to FIG. 1, shown is a preferred device 11 of the invention for delivering epithermal neutrons. Device 11 includes a first polymer layer 12 having embedded therein a self-contained, chemical source of alpha-radiation, for example an amount of $^{208}$Po. Illustrative dimensions for layer 12 include 10 mm×10 mm×3 mm. The alpha source 13 can be, for example, located within a 3 mm diameter bore centrally located in the layer 12. Device 11 further includes a second polymer layer 14, defining a diffraction opening 15 for passing and diffracting alpha-radiation emanating from alpha source 13. Layer 14 can be sized similarly to layer 12. Diffraction opening 15, which is axially aligned with alpha source 13, can be for example 1 mm in diameter.

With continued reference to FIG. 1, device 11 also includes polymer layer 16 having embedded therein Boron- 10 (an isotope of boron having mass number 10) which generates epithermal neutrons upon bombardment by alpha-radiation. Again, layer 16 can be sized similarly to layers 12 and 14, and neutron source 17 is in registry with opening 15 to receive alpha-radiation passing through opening 15. Polymer layer 18 is also provided, which can be similar in size to the above-described layers. Layer 18 includes a diffraction opening 19 aligned with thermal neutron source 17, which serves to pass and diffract epithermal neutrons generated by neutron source 17. Device 11 may also optionally include a further layer 20, which can be dimensioned similarly to the above-described layers. Layer 20 can include an embedded article 21 containing an amount of liquid nitrogen, to provide cooling to the device 11. In construction of device 11, the various layers 12, 14, 16, 18 and 20 can be bonded to one another to form an overall laminate which may be used to deliver epithermal neutrons for a variety of applications.

Figure 2:
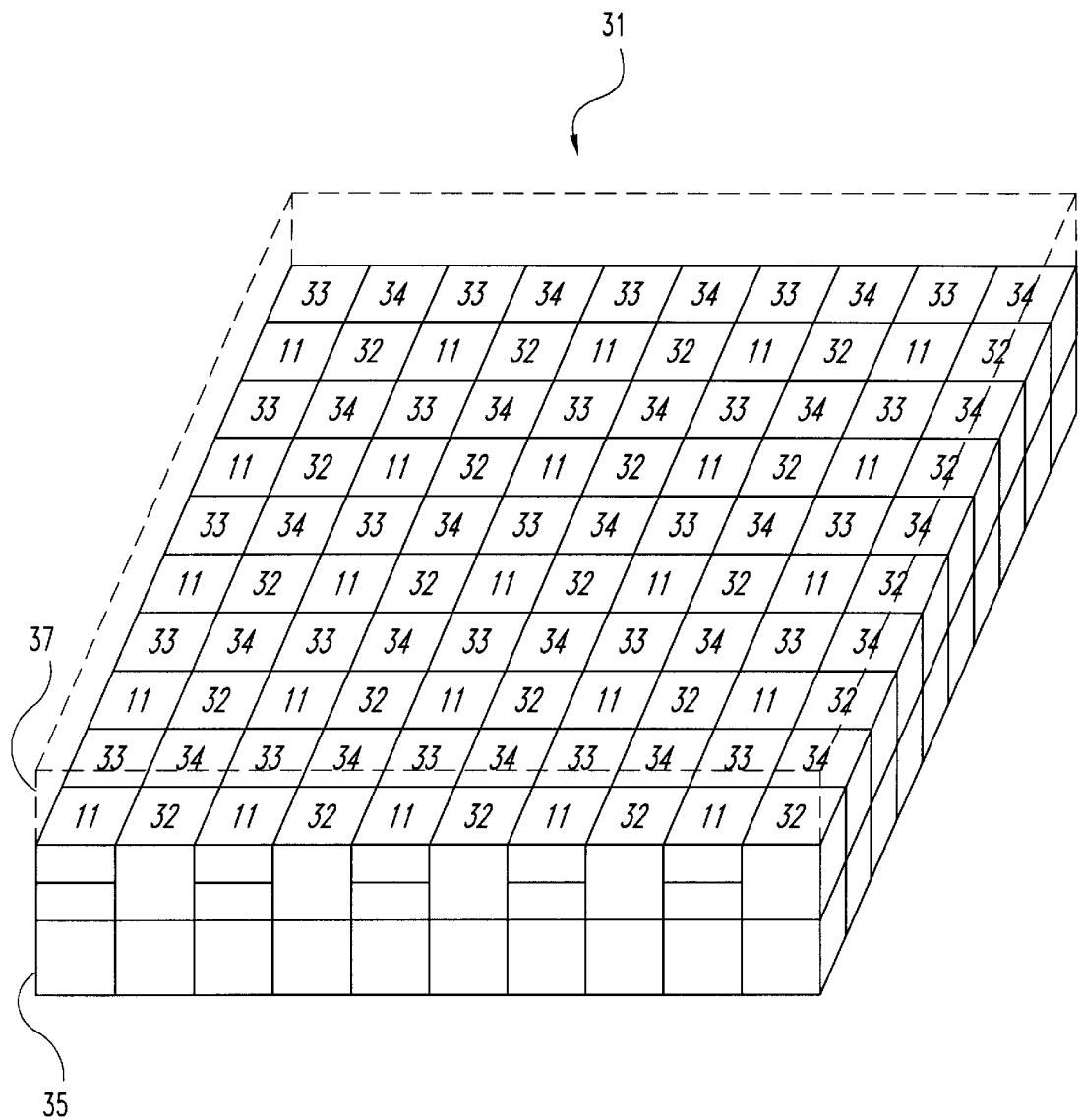
FIG. 2 is a schematic diagram illustrating the composition of an array device of the invention including a plurality of radiation sources and detectors.

FIG. 2 depicts a radiation source/detector array device 31 of the invention, which can incorporate a plurality of devices 11. Array device 31 may include a plurality of other radiation sources and detectors, including for example x-ray, infrared, neutron, and gamma radiation sources and detectors. Suitable X-ray detectors, neutron detectors and gamma radiation detectors include semiconductive wafers available, for example, from Motorola, Inc. In accordance with the invention, the detectors in the array device 31 are selected to detect predetermined characteristic signal(s) from an object to be interrogated, for example signal(s) characteristic of plastique or other explosive types, of particular elements or molecules in a sample to be assayed, or other like characteristic signals. The specific illustrated device 11 includes a plurality of X-ray sources 32, a plurality of neutron detectors 33, and a plurality of x-ray detectors 34, and can be advantageously used in the interrogation of objects such as luggage, as discussed more fully in passages which follow.

A preferred array device 31 can constructed by positioning a sheet of mylar 35 on a flat piece of steel, the steel having no more than about 0.01 (0.025 cm) inch of deviation per $ft^2$ (0.09 $m^2$). A prefabricated mask of Mylar polyester film with precut 0.1 mm wide grooves is placed on the first sheet of Mylar polyester film. The mask defines the pattern of conductive material desired for electrical connection to detectors 33 and 34 in the array (See. e.g. FIG. 3). Aluminum or another suitable conductive material is then imprinted onto the mask over the Mylar polyester film. The neutron and X-ray semiconductor detectors 33 and 34 are then positioned where desired in the array, and electrically connected to the imprinted leads by heating. A plurality of radiation source devices, e.g. thermal neutron-delivery devices 11 and X-ray sources 32, are then affixed, e.g. bonded, to the Mylar polyester film sheet in the desired locations in the grid. A layer of heat stable adhesive can then be applied overtop the first Mylar polyester film sheet and sources/detectors. At this point, particularly if devices 11 lack layer 20 and its embedded liquid nitrogen 21, a hollow metal wire, such as a hollow aluminum wire, can be run circuitously across the array within the adhesive, filled with liquid nitrogen and capped, to provide cooling to the overall array. Prior to cure of the adhesive, another clean sheet of Mylar polyester film 37 is then placed over the underlying electronics, and the overall device can be topped off with one or more additional layers of Mylar polyester film on the sides. In this regard, the sheets of Mylar polyester film employed can be about 0.1 mm thick.

Figure 3:
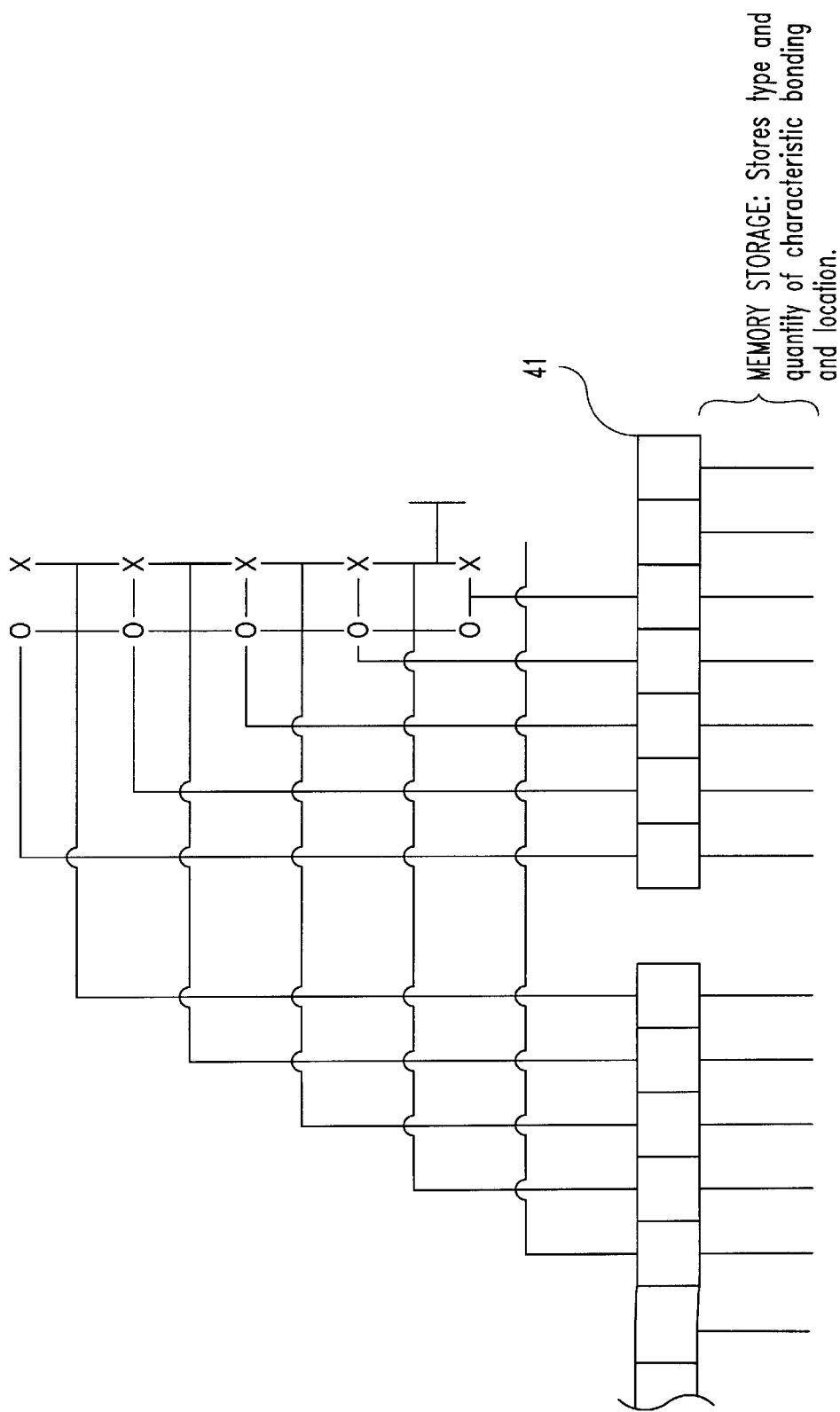
FIG. 3 is a schematic diagram illustrating an imprinted conductive pattern useful in array devices of the invention.

Referring now to FIG. 3, shown is an illustration of a conductive pattern imprint which can be used in devices 31 of the invention. Additionally shown schematically are a plurality of memory storage devices 41 electrically connected to the output from detectors in the device 31.

Figure 4:
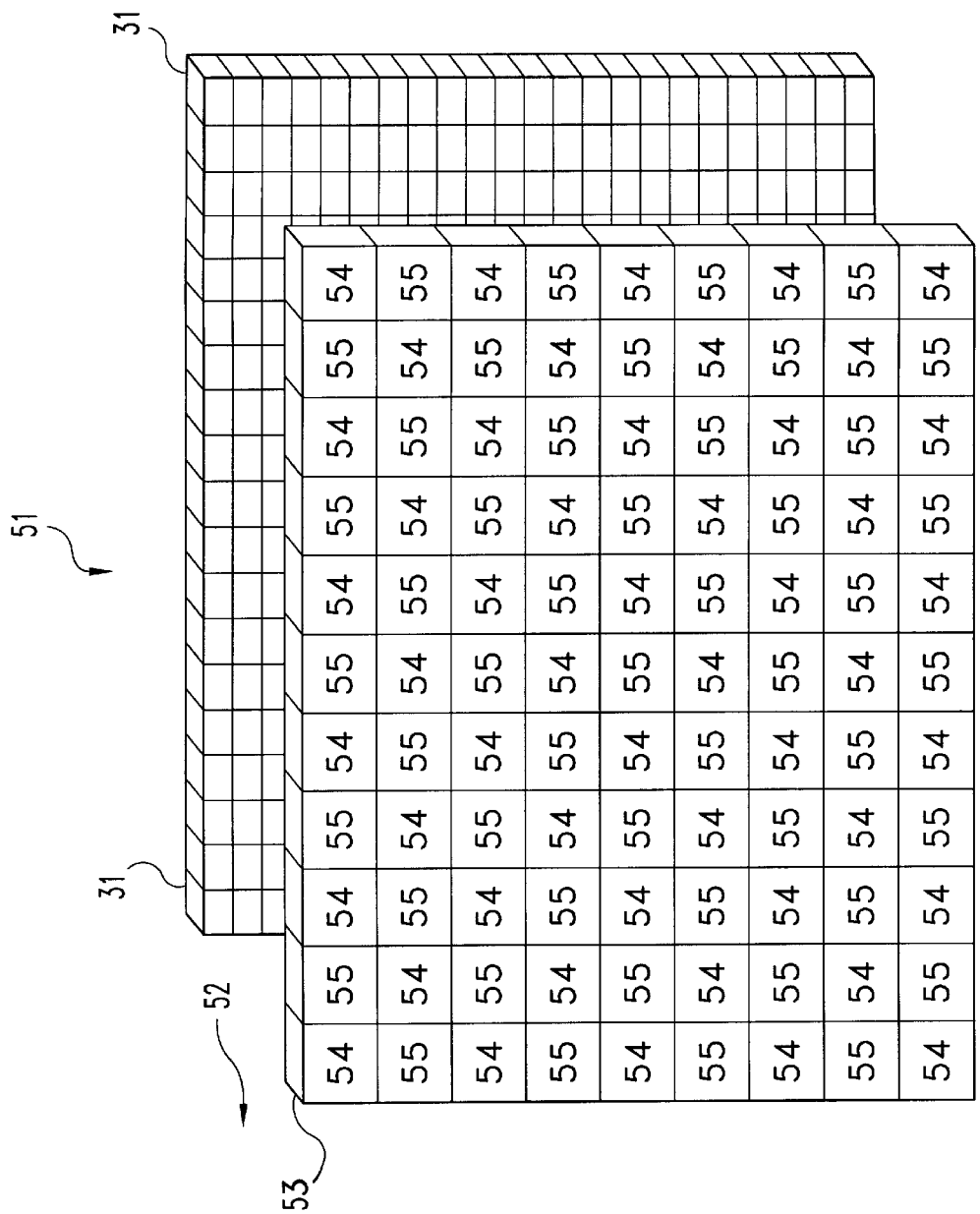
FIG. 4 is a view illustrating the use of an array device of the invention in interrogating an object.

Referring now to FIG. 4, shown is an illustrative non-destructive detection system 51 which includes one or more array devices such as device 31 illustrated herein. The devices 31 are situated on one side of an object path 52 along which objects to be interrogated are passed. On the other side of object path 52 is an array of film 53, for example X-ray film 54, to receive and process signals from objects passed along path 52. In addition, array 53 could also include infrared film 55 to detect infrared radiation emitted by the sample upon impingment by radiation (e.g. epithermal neutrons or other radiation) from the sources in array 31. In use, an object to be interrogated is passed along path 52, and is impinged upon by radiation from the array or arrays 31, thus emitting characteristic signals which are detected by detectors within array device 31 and/or by film within array 53. Those characteristic signals are then compared to characteristic signals for known plastique explosives or other materials of interest, to make a determination whether such substances are present in the object under interrogation.

It is preferable in accordance with the invention to utilize low energy epithermal neutrons to interrogate objects or substances under study. Epithermal neutrons, due to their lack of charge, are not significantly susceptible to interference by cations or anions in the object or sample. The epithermal neutrons used will desirably be of a predetermined energy level, typically in the range of about 0.5 eV to about 1.25 eV, which is selected to elicit a specific interaction with the sample and output a predetermined characteristic signal, e.g. a characteristic elastic scattering of neutrons, and/or the generation of a characteristic gamma and/or infrared radiation signal.

It will be understood that thermal neutron delivering devices 11 and array devices 31 of the invention can be used in a variety of applications. For example, the devices can be used in the interrogation of luggage or packages in airline and other industries, and in the interrogation for specific metals, plastics, ceramics or textiles. In addition, array devices 31 can be formed as two- or three-dimensional arrays, and used in other areas such as in monitoring the flow of gases or liquids, or components of the same, inside barriers, and/or to monitor environmental hazards such as radioactive materials, high explosives, VOC's and metals, in situ, for environmental bioremediation. The devices of the invention require minimal or no input power, and thus are suited for use in portable devices, e.g. which monitor water, oxygen or other atomic or molecular content in remote areas, e.g. in the field of planetary exploration. In such remote monitoring, devices can be equipped with miniature radio or microwave antenna for transmission of signals.

While the invention has been described in detail in the foregoing passages in relation to specific, preferred embodiments, it will be understood by the skilled artisan that modifications and additions can be made to the illustrated devices without departing from the spirit and scope of the present invention.

What is claimed is:

1. A laminate device for self-contained delivery of epithermal neutrons, comprising:
   a first polymer layer having embedded therein a chemical source of alpha-radiation;
   a second polymer layer, the second polymer layer being opaque to alpha-radiation and having defined therein a diffraction opening for passing alpha-radiation from said chemical source of alpha-radiation;

a third polymer layer having embedded therein a source of epithermal neutrons, said third polymer layer being positioned relative to said second polymer layer such that alpha-radiation from said chemical source of alpha-radiation impinges upon the source of neutrons, thereby generating epithermal neutrons; and a fourth polymer layer, said fourth polymer layer being impermeable to epithermal neutrons and defining a diffraction opening for passing said generated epithermal neutrons.

2. The device of claim 1, which also includes a fifth polymer layer having embedded therein a sealed article containing liquid nitrogen, for cooling the device.

3. A radiation source/detector array device for non-destructive interrogation, comprising:

a non-conductive substrate opaque to epithermal neutrons;

a pattern of electrically conductive material imprinted upon said non-conductive substrate, said pattern providing a plurality of leads for electrical connection of radiation detectors;

a plurality of radiation detectors affixed to said substrate and electrically connected to said plurality of leads; and a plurality of self-contained radiation sources affixed to said substrate.

4. The device of claim 3 wherein said plurality of self-contained radiation sources includes devices according to claim 1.

5. The device of claim 4 which also includes a plurality of x-ray sources, and a plurality of x-ray detectors.

6. The device of claim 5, which also includes a plurality of neutron detectors.

7. A method for non-destructively interrogating an object, comprising:

positioning said object adjacent a source/detector array device for non-destructive interrogation, the device including:

a non-conductive substrate;

a pattern of electrically conductive material imprinted upon said non-conductive substrate, said pattern providing a plurality of leads for electrical connection of radiation detectors;

a plurality of radiation detectors affixed to said substrate and electrically connected to said plurality of leads; and a plurality of self-contained radiation sources affixed to said substrate;

so that the object interacts with radiation generated by said radiation sources and generates a characteristic radiation signal; and detecting said characteristic radiation signal with said detectors.

8. The method of claim 7 wherein said radiation sources include thermal neutron sources.

9. The method of claim 8 wherein the epithermal neutron sources include:

a first polymer layer having embedded therein a chemical source of alpha-radiation;

a second polymer layer, the second polymer layer being opaque to alpha-radiation and having defined therein a diffraction opening for passing alpha-radiation from said chemical source of alpha-radiation;

a third polymer layer having embedded therein a chemical source of epithermal neutrons, said third polymer layer being positioned relative to said second polymer layer such that alpha-radiation from said source of alpha-radiation impinges upon the source of neutrons, thereby generating epithermal neutrons; and a fourth polymer layer, said fourth polymer layer being opaque to epithermal neutrons and defining a diffraction opening for passing said generated epithermal neutrons.

* * * * *